United States Patent Office 3,544,480
Patented Dec. 1, 1970

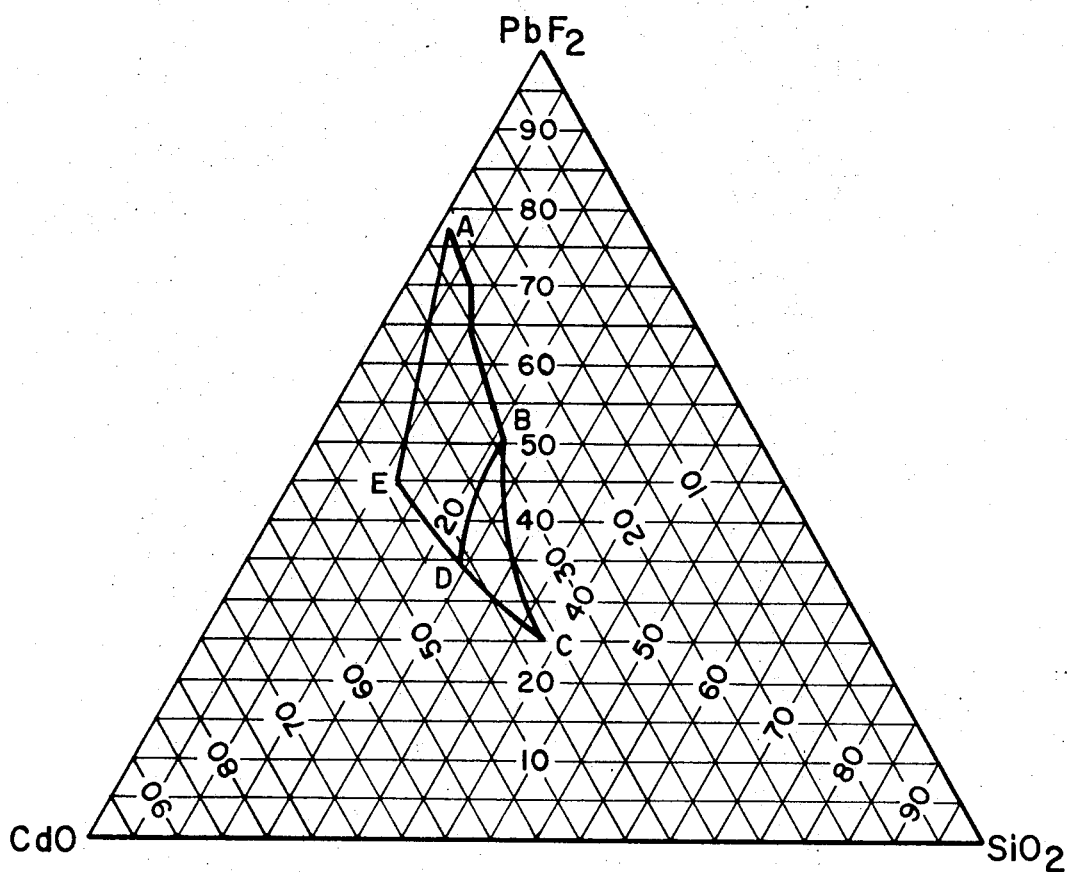

3,544,480
CADMIUM SILICATE CRYSTALS
Kenneth O. Beck, Newton, Mass., assignor to Corning Glass Works, Corning, N.Y., a corporation of New York
Filed Jan. 11, 1968, Ser. No. 697,236
Int. Cl. C01b 33/20; C09k 1/04
U.S. Cl. 252—301.6                        12 Claims

ABSTRACT OF THE DISCLOSURE

This invention relates to a method of growing single crystals of dicadmium silicate ($Cd_2SiO_4$) and tricadmium silicate ($Cd_3SiO_5$) from a saturated solution of cadmium oxide (CdO) and silicon dioxide ($SiO_2$) in lead fluoride ($PbF_2$). The tricadmium silicate is a semiconducting material and the dicadmium silicate can be used as a phosphor.

BACKGROUND OF THE INVENTION

The first systematic study of the cadmium oxide-silicon dioxide system was reported by L. S. Dent Glasser and F. P. Glasser in an article entitled, "The Preparation and Crystal Data of Cadmium Silicates $CdSiO_3$, $Cd_2SiO_4$, and $Cd_3SiO_5$" which appeared in Inorganic Chemistry, volume 3, No. 9, September 1964. The article disclosed a method of making the cadmium silicates by the direct heating method. This method comprises melting cadmium oxide and silicon dioxide together in various proportions and then cooling the melt so as to obtain the desired cadmium silicate. Crystallographic and melting data were disclosed, but no data concerning any other properties were produced. Due to the volatility of cadmium oxide and the viscosity of silicon dioxide, it is difficult to grow large single crystals of cadmium silicate using the direct heating method. Hence, if large single crystals are to be grown for investigation and utilization, other techniques had to be found.

SUMMARY

In order to better study the cadmium silicate system I utilized the molten salt solution technique for growing cadmium silicate crystals. This technique is disclosed in my application entitled, "Growth of Cadmium Oxide Crystals," Ser. No. 697,235, filed concurrently herewith. The molten salt solution technique basically comprises forming a saturated solution of cadmium oxide and silicon dioxide in a molten solvent salt, cooling the saturated solution until the cadmium silicate crystals begin to grow, thereafter continuing to cool the solution to a temperature just above that at which a second phase will begin to precipitate and then drawing off the remaining liquid. After the remaining liquid is drawn off, the crystals of cadmium silicate will be found adhering to the crucible. The primary advantages of this method are: that it can be preformed at low enough temperature so that volatilization of the cadmium oxide is not a problem and the silicon dioxide is in solution so that its viscosity is not a problem.

Furthermore, by using this technique the crystals which are grown can be doped, if desired, with materials which could not be used when other crystal growing techniques are used, due to the dopant's volatility or decomposition. Such dopants include $As_2O_3$, $Mn_2N_3$, and CuO.

Another advantage resides in the fact that large single crystals can be grown, as opposed to the small crystals as disclosed by Glasser. However, most surprisingly, I have discovered that tricadmium silicate is a semiconductor. This is most unusual in view of the fact that all reported silicates, to date, are not semiconducting. The dicadmium silicate can be used as a phosphor.

BRIEF DESCRIPTION OF THE DRAWING

The drawing is a triaxial composition diagram of the cadmium oxide-lead fluoride-silicon dioxide system indicating the compositional fields wherein dicadmium silicate and tricadmium single crystals may be grown.

DESCRIPTION OF THE PREFERRED EMBODIMENT

I have found that the preferred molten salt solvent, or flux, is lead fluoride. Therefore, in order to grow my single crystals of cadmium silicate I use a cadmium oxide-lead fluoride-silicon dioxide system. I have restricted my work to those portions of the system which are not rich in silicon dioxide or in cadmium oxide. Compositions which contain substantially more silicon dioxide than cadmium oxide required prolonged soaking times at high temperatures for complete solution with a consequent change in composition of the solution due to volatilization; the resultant solutions were viscous and produced glasses instead of crystals on cooling. The compositions which were high in cadmium oxide were not studied because of high melting points and problems with the volatilization of cadmium oxide. Solutions which were very rich in lead fluoride were not studied again because lead fluoride crystallizes from these solutions. Most volatilization losses occur at a temperature greater than about 900° C. Therefore, in general, my studies have been limited to a lead fluoride-cadmium oxide-silicon dioxide system which is not rich in cadmium oxide or silicon dioxide and not very rich in lead fluoride, and which will form saturated solutions at temperatures less than about 900° C. Temperatures higher than 900° C. can be used but sealed containers would be required. One problem which could occur at these higher temperatures when utilizing sealed containers is that the cadmium oxide may corrode the platinum crucible which is used.

A saturated solution of cadmium oxide and silicon dioxide in lead fluoride is prepared by heating the selected mixture of cadmium oxide, silicon dioxide, and lead fluoride to a temperature greater than the liquidus temperature for that mixture. In order to maintain the composition of the solution, it is not heated above the volatilization temperature, or about 900° C. Therefore, the solution temperatures can be said to be between the liquidus temperature for the selected mixture and about 900° C. The saturated solution is then allowed to cool from the solution temperature down through the liquidus temperature. As the temperature decreases below the liquidus temperature, the primary cadmium silicate phase begins to precipitate. During the next stage of cooling, the primary cadmium silicate phase begins to grow and the remaining liquid becomes depleted in cadmium oxide and silicon dioxide. Thus, the composition of the liquid is continuously shifted toward one of the boundary curves defining the particular cadmium silicate phase field which has been selected. That liquid may be drawn off, before the boundary curve is reached, thus leaving only the primary cadmium silicate crystal. The minimum temperature at which the liquid may be drawn off, before it reaches a boundary composition, is about 620° C. Alternatively, the solution may be allowed to continue to cool. The composition of the liquid will then follow the boundary curve and a second phase will be precipitated along with the primary phase. This may be allowed to continue until a temperature just above the ternary eutectic point is reached, at that temperature, the remaining liquid must be drained off. This is less desirable than the prior method wherein the liquid is removed before the second phase begins to precipitate because of the problem in separating the primary and secondary crystals.

This method of draining off the remaining liquid has been found to be the easiest way to separate the desired crystals. By draining off the liquid before the first boundary curve is intersected the only remaining crystals are the desired cadmium silicate crystals. However, if the solution were allowed to cool to a temperature immediately above the ternary eutectic temperature, it would not be impossible, but it would be difficult, to identify and separate the desired cadmium silicate crystals. However, if the solution were allowed to cool below the ternary eutectic temperature, the whole solution would freeze into a solid mass and it would be extremely difficult to separate the desired crystals. Unsuccessful attempts have been made to remove the desired cadmium silicate crystals by dissolving the surrounding material. This has proven to be unsatisfactory because the lead fluoride is, in general, less soluble than the cadmium silicate crystals.

Powdered high purity reactants have been used in the preparation of all melts. The particle size of the reactants has little, if any, effect on the final single crystals. However, powdered, sub 300 mesh particles, were used since this increased the solution rates. The reactants are thoroughly mixed and then placed into a platinum crucible. For a crucible cover, a thin (.005 inch) platinum sheet is hand crimped over the crucible. With this procedure, volatilization losses are negligible. The crucible and its charge are then placed into a box type furnace which is capable of very accurate temperature control.

In general, the cadmium silicate crystals grow on the walls or bottom of the crucible, so that they remain secured to the crucible when the remaining liquid is drawn off. However, if they do not remain secured, the remaining liquid could be filtered so as to prevent the cadmium silicate crystals which are contained therein from being solidified in the remaining liquid.

As the cooling rate from the liquidus temperature down to the boundary curve temperature or ternary eutectic temperature decreases, the size of the cadmium silicate crystals which grow increases. Hence, there is a direct relationship between the size of the cadmium silicate crystals and the cooling rate. Cooling rates from about 100° C. per hour down to about 1° C. per hour have been tested and it has been found that the largest crystals of cadmium silicate grow at the slower cooling rates. The maximum practical cooling rate is about 20° C. per hour.

I have found that the crystal growth and shape will be greatly affected by a temperature gradient in the crucible. That is, the crystals will begin to form at the coolest part of the crucible. If there is no temperature gradient, the crystals will grow in a random manner in the solution itself. It is most convenient to make the side wall of the crucible the coolest portion thereof; this may be done by the suitable location of a furnace heating element. Additionally, if it is desired, the bottom or top of the crucible may be made the coolest portion, again by suitable location of the heating elements.

I have found that when I prepare solutions having a composition within the field defined by ABDE on the triaxial diagram and treated in the above manner, I can grow tricadmium silicate single crystals. Briefly, particulate cadmium oxide, silicon dioxide, and lead fluoride are mixed together in a proportion as defined within the range ABDE and then placed into a platinum crucible. The crucible is then heated to a solution temperature between the liquidus for the selected composition and 900° C. Depending upon the composition, the liquidus may be between 620° and 850° C. The mixture is then held at the solution temperature until complete solution is obtained. Thereafter, the solution is slowly cooled to a temperature just above the first intersected boundary curve, or where a secondary crystal phase will begin to precipitate. At that temperature, the remaining liquid is drawn off and the desired tricadmium silicate single crystals may be removed. These crystals of tricadmium silicate are normally red in color and have a truncated octahedral crystal habit. In that habit, the 100 and 111 crystal planes predominate. This material is semiconducting and typical data are as follows: electron concentration $10^{18}$ per cm.$^3$, resistivity 0.4 ohm cm., and energy gap 2.4 ev. These data are essentially independent of the processing parameters. Crystals up to 1 centimeter long and 3 grams in weight have been grown. Crystals of this size and weight normally grow at the slowest cooling rates and with the largest temperature gradient.

Dicadmium silicate single crystals have been grown from solution compositions defined by the field BCD. These crystals are grown by the same technique as above. These crystals are normally dendritic and have a bright yellow color. The dicadmium silicate must be grown at a somewhat faster cooling rate than the tricadmium silicate. This is believed to be true because it is felt that the tricadmium silicate forms under equilibrium conditions and that the dicadmium silicate is metastable with respect to the solutions. The liquidus temperature in this field is from about 630° C. to 850° C.

Flaws have been found in crystals which are grown from essentially pure lead fluoride flux. However, if lead oxide (PbO) is substituted for lead fluoride up to a maximum of 30 mol percent, it was found that the crystal quality could be increased.

The following examples will better illustrate my invention:

EXAMPLE I 362 grams of powdered lead fluoride were mixed with 120 grams of cadmium oxide and 16 grams of silicon dioxide. This is equivalent to a 55 mol percent lead fluoride-35 mol percent cadmium oxide-10 mol percent silicon dioxide mixture. This mixture was put in a platinum crucible which was heated to 850° C., although the liquidus is 800° C., and held there for two hours, until the mixture was completely liquid. The melt was then cooled at a rate of 1° C. per hour to about 620° C., with the front side of the crucible close to the furnace door so that the front side of the crucible was the coolest portion. The crucible was then quickly removed from the furnace and the remaining liquid was poured off. After cooling to room temperature, large crystals, about 1.0 cm. long, of tricadmium silicate were found adhering to the front portion of the crucible.

EXAMPLE II 305 grams of powdered lead fluoride were mixed with 160 grams of cadmium oxide and 37 grams of silicon dioxide. This is equivalent to a 40 mol percent lead fluoride-40 mole percent cadmium oxide-20 mol percent silicon dioxide mixture. This mixture was put into a crucible which was heated to 850° C. although the liquidus is about 800° C. and held there for two hours, until the mixture was completely liquid. The melt was then cooled at a rate of 1° C. per hour to about 620° C., with the front side of the crucible close to the furnace door so that the front side of the crucible was the coolest portion. The crucible was then quickly removed from the furnace and the remaining liquid was poured off. After cooling to room temperature, large crystals, about 1.0 cm. long, of tricadmium silicate were found adhering to the front portion of the crucible.

EXAMPLE III 307 grams of powdered lead fluoride were mixed with 143 grams of cadmium oxide and 48 grams of silicon dioxide. This is equivalent to a 40 mol percent lead fluoride-35 mol percent cadmium oxide-25 mole percent silicon dioxide mixture. This mixture was heated to 850° C., although the liquidus is about 730° C., and held there for about two hours, until the mixture was completely liquid. The melt was then cooled at a rate of 1° C. per hour, to about 620° C., with the front side of the crucible close to the furnace door so that the front side of the crucible was the coolest portion. The crucible was then quickly removed from the furnace and the remaining liquid was poured off. After cooling to room temperature, large crystals of dicadmium silicate were found adhering to the front portion of the crucible. These crystals had a needle-like shape and were about 5 mm. long and 1.0 mm. thick.

I claim:
1. A method for growing single crystals of $Cd_3SiO_5$ comprising the steps of:
   (1) melting a mixture of high purity CdO and $SiO_2$ and $PbF_2$ having a composition defined by ABDE on the triaxial diagram at a temperature higher than the liquidus of the mixture for a period of time sufficient to obtain complete solution and reaction between said CdO and $SiO_2$;
   (2) slowly cooling the solution through the liquidus temperature, causing the growth of $Cd_3SiO_5$ crystals therein, to a temperature near but above that at which a second crystal phase will precipitate; and then
   (3) separating the thus-formed $Cd_3SiO_5$ crystals from the solution remaining.

2. A method according to claim 1 wherein the melting temperature ranges from between about the liquids temperature of the mixture to about 900° C.

3. A method according to claim 1 wherein the rate of cooling the solution ranges between about 1°–100° C. per hour.

4. A method according to claim 1 wherein the temperature at which a second crystal phase will precipitate is about 620° C.

5. A method according to claim 1 wherein said $Cd_3SiO_5$ crystals are doped with $As_2O_3$ and/or $Mn_2O_3$ and/or CuO.

6. A method according to claim 1 wherein PbO is substituted for $PbF_2$ on an equal mole basis up to about 30 mole percent.

7. A method for growing single crystals of $Cd_2SiO_4$ comprising the steps of:
   (1) melting a mixture of high purity CdO and $SiO_2$ and $PbF_2$ having a composition defined by BCD on the triaxial diagram at a temperature higher than the liquidus of the mixture for a period of time sufficient to obtain complete solution and reaction between said CdO and $SiO_2$;
   (2) slowly cooling the solution through the liquidus temperature, causing the growth of $Cd_2SiO_4$ crystals therein, to a temperature near but above that at which a second crystal phase will precipitate; and then
   (3) separating the thus-formed $Cd_2SiO_4$ crystals from the solution remaining.

8. A method according to claim 7 wherein the melting temperature ranges from between about the liquidus temperature of the mixture to about 900° C.

9. A method according to claim 7 wherein the rate of cooling the solution ranges between about 1°–100° C. per hour.

10. A method according to claim 7 wherein the temperature at which a second crystal phase will precipitate is about 620° C.

11. A method according to claim 7 wherein said $Cd_2SiO_4$ crystals are doped with $As_2O_3$ and/or $Mn_2O_3$ and/or CuO.

12. A method according to claim 7 wherein PbO is substituted for $PbF_2$ on an equal mole basis up to about 30 mole percent.

References Cited

UNITED STATES PATENTS

| | | | |
|---|---|---|---|
| 2,260,924 | 10/1941 | Swindells | 252—301.6 |
| 2,423,830 | 7/1947 | Fonda | 252—301.6 XR |
| 2,452,518 | 10/1948 | Burns | 252—301.6 |

FOREIGN PATENTS

| | | | |
|---|---|---|---|
| 758,940 | 10/1956 | Great Britain | 252—301.6 |

OTHER REFERENCES

Chem. Abstracts, vol. 42, page 4855 (1948).
Electronic Engineering, December 1946, pages 361, 362, and 365.

EDWARD STERN, Primary Examiner

U.S. Cl. X.R.

23—110